US012621817B1

(12) United States Patent
Singh

(10) Patent No.: US 12,621,817 B1
(45) Date of Patent: May 5, 2026

(54) METHODS AND DEVICES TO GENERATE A SPECTRUM UTILIZATION MAP FOR DETERMINING USE OF RADIO SPECTRUM GUARD BANDS FOR A MOBILE SATELLITE SERVICE NETWORK

(71) Applicant: Telcom Ventures, LLC, Miami, FL (US)

(72) Inventor: Rajendra Singh, Indian Creek Village, FL (US)

(73) Assignee: Telcom Ventures, LLC, Miami, FL (US)

( * ) Notice: Subject to any disclaimer, the term of this patent is extended or adjusted under 35 U.S.C. 154(b) by 0 days.

(21) Appl. No.: 19/369,805

(22) Filed: Oct. 27, 2025

(51) Int. Cl.
*H04W 72/0457* (2023.01)
*H04W 84/06* (2009.01)

(52) U.S. Cl.
CPC ........ *H04W 72/0457* (2023.01); *H04W 84/06* (2013.01)

(58) Field of Classification Search
None
See application file for complete search history.

(56) References Cited

U.S. PATENT DOCUMENTS 7,151,795 B1 * 12/2006 Goldburg .............. H04W 52/34
455/67.11
10,108,757 B1 * 10/2018 Aghajan ............... H04W 24/10

| 12,342,181 | B1 * | 6/2025 | Singh | H04W 16/14 |
| 12,471,076 | B1 * | 11/2025 | Singh | H04W 72/0453 |
| 2007/0032254 | A1 * | 2/2007 | Chen | H04W 16/14 |
| | | | | 455/509 |
| 2007/0097891 | A1 * | 5/2007 | Kitchin | H04W 28/26 |
| | | | | 370/310 |
| 2015/0011233 | A1 * | 1/2015 | Kazmi | H04W 72/044 |
| | | | | 455/454 |
| 2015/0087323 | A1 * | 3/2015 | Srikanteswara | H04W 16/04 |
| | | | | 455/452.1 |
| 2016/0056916 | A1 * | 2/2016 | Hassan | H04W 16/14 |
| | | | | 370/252 |
| 2019/0239082 | A1 * | 8/2019 | Ravishankar | H04B 7/18528 |
| 2024/0306036 | A1 * | 9/2024 | Abotabl | H04W 72/12 |

* cited by examiner

*Primary Examiner* — German Viana Di Prisco
(74) *Attorney, Agent, or Firm* — Myers Bigel, P.A.

(57) ABSTRACT

Disclosed are methods for allocating spectrum by a Mobile Satellite Service (MSS) satellite to a User Equipment (UE). The method includes monitoring radio spectrum designated as guard bands of a terrestrial Broadband Wireless Access (BWA) network to generate a spectrum usage map of guard band frequencies of the guard bands. The spectrum usage map includes available guard band frequency bands including unlicensed frequency bands. The method includes selecting a guard band or a sub-band within the available guard band frequency bands for uplink communication based on the spectrum usage map, and receiving, by the MSS satellite from the UE, uplink signals on the guard band or the sub-band that was selected. Related wireless electronic devices and systems are also discussed.

27 Claims, 9 Drawing Sheets

START

MONITORING RADIO SPECTRUM DESIGNATED AS GUARD BANDS OF A TERRESTRIAL BROADBAND WIRELESS ACCESS (BWA) NETWORK TO GENERATE A SPECTRUM USAGE MAP OF GUARD BAND FREQUENCIES OF THE GUARD BANDS, WHEREIN THE SPECTRUM USAGE MAP COMPRISES AVAILABLE GUARD BAND FREQUENCY BANDS COMPRISING UNLICENSED FREQUENCY BANDS — 510

SELECTING A GUARD BAND OR A SUB-BAND WITHIN THE AVAILABLE GUARD BAND FREQUENCY BANDS FOR UPLINK COMMUNICATION BASED ON THE SPECTRUM USAGE MAP — 520

RECEIVING, BY THE MSS SATELLITE FROM THE UE, UPLINK SIGNALS ON THE GUARD BAND OR THE SUB-BAND THAT WAS SELECTED — 530

| TERRESTRIAL UPLINK (UE TO BASE STATION) | GUARD BAND | TERRESTRIAL DOWNLINK (BASE STATION TO UE) |
|---|---|---|

→ Freq

| TERRESTRIAL USE (MOBILE SERVICE) | GUARD BAND | FIXED SATELLITE SERVICE (E.G., DOWNLINK VIDEO) |
|---|---|---|

→ Freq

| TERRESTRIAL SYSTEM #1 (UPLINK OR DOWNLINK) | GUARD BAND | TERRESTRIAL SYSTEM #2 (UPLINK OR DOWNLINK) |
|---|---|---|

→ Freq

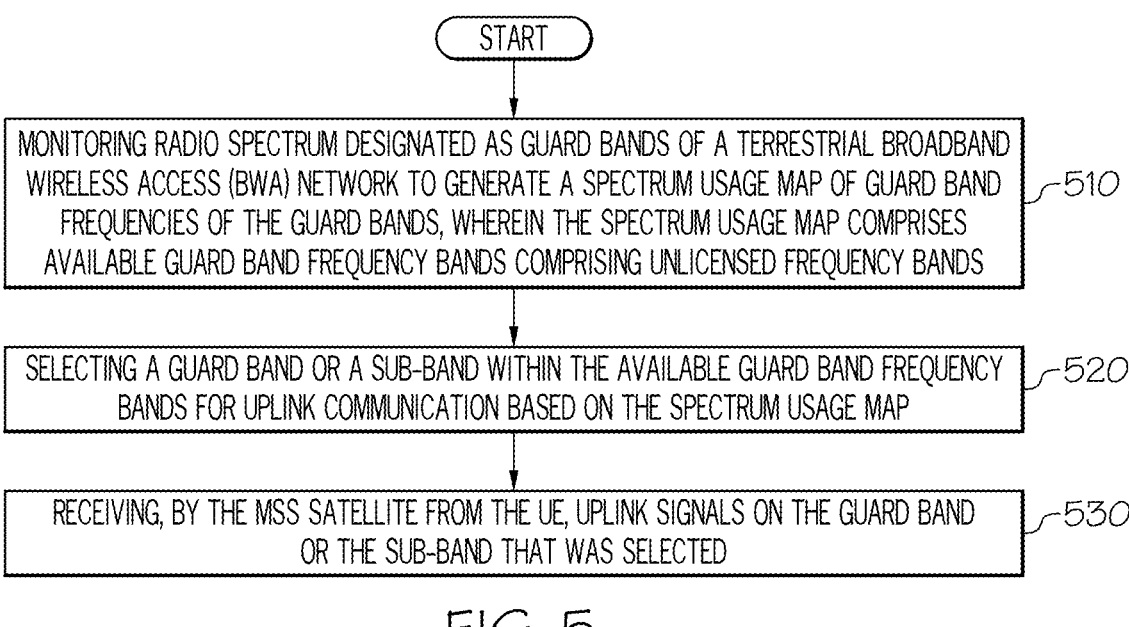

START

MONITORING RADIO SPECTRUM DESIGNATED AS GUARD BANDS OF A TERRESTRIAL BROADBAND WIRELESS ACCESS (BWA) NETWORK TO GENERATE A SPECTRUM USAGE MAP OF GUARD BAND FREQUENCIES OF THE GUARD BANDS, WHEREIN THE SPECTRUM USAGE MAP COMPRISES AVAILABLE GUARD BAND FREQUENCY BANDS COMPRISING UNLICENSED FREQUENCY BANDS ⌐510

SELECTING A GUARD BAND OR A SUB-BAND WITHIN THE AVAILABLE GUARD BAND FREQUENCY BANDS FOR UPLINK COMMUNICATION BASED ON THE SPECTRUM USAGE MAP ⌐520

RECEIVING, BY THE MSS SATELLITE FROM THE UE, UPLINK SIGNALS ON THE GUARD BAND OR THE SUB-BAND THAT WAS SELECTED ⌐530

FIG. 5

TRANSMITTING, BY THE MSS SATELLITE TO THE UE, AN INDICATION OF THE GUARD BAND OR THE SUB-BAND THAT WAS SELECTED FOR UPLINK COMMUNICATION ⌐610

FIG. 6

RECEIVING, BY THE UE FROM THE MSS SATELLITE, DOWNLINK SIGNALS ON A DIFFERENT GUARD BAND OR DIFFERENT SUB-BAND OF THE BWA NETWORK BASED ON THE SPECTRUM USAGE MAP ⌐710

FIG. 7

TRANSMITTING, BY THE MSS SATELLITE, THE SPECTRUM USAGE MAP FOR USE BY THE UE ⌐810

FIG. 8

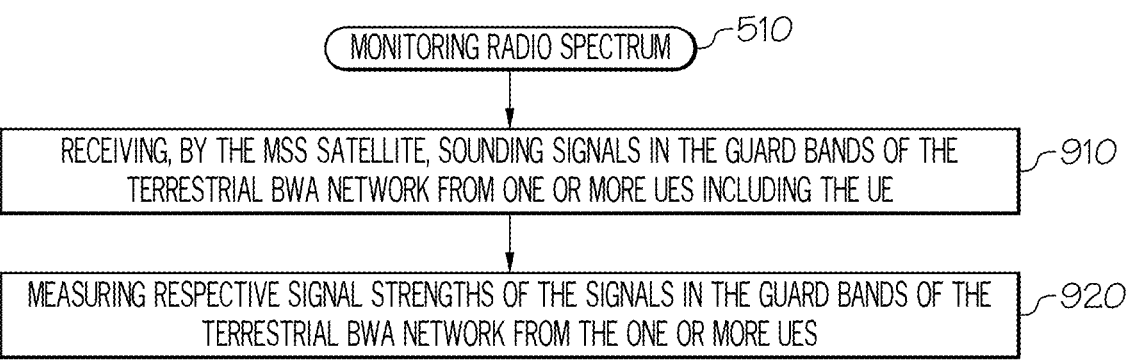

MONITORING RADIO SPECTRUM ⌐510

RECEIVING, BY THE MSS SATELLITE, SOUNDING SIGNALS IN THE GUARD BANDS OF THE TERRESTRIAL BWA NETWORK FROM ONE OR MORE UES INCLUDING THE UE ⌐910

MEASURING RESPECTIVE SIGNAL STRENGTHS OF THE SIGNALS IN THE GUARD BANDS OF THE TERRESTRIAL BWA NETWORK FROM THE ONE OR MORE UES ⌐920

FIG. 9

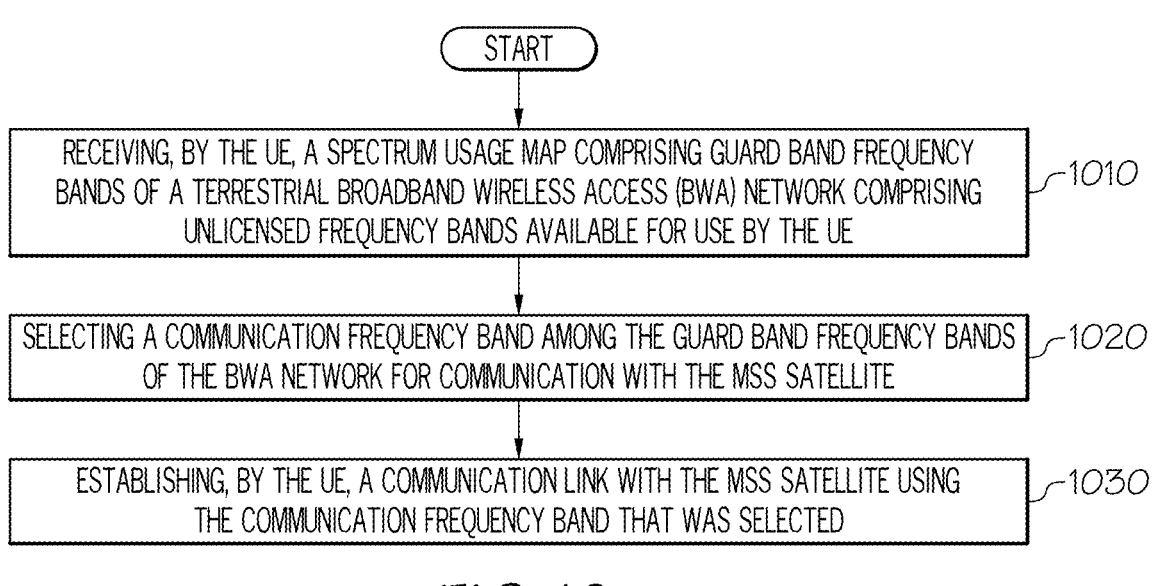

START

RECEIVING, BY THE UE, A SPECTRUM USAGE MAP COMPRISING GUARD BAND FREQUENCY BANDS OF A TERRESTRIAL BROADBAND WIRELESS ACCESS (BWA) NETWORK COMPRISING UNLICENSED FREQUENCY BANDS AVAILABLE FOR USE BY THE UE ⟋1010

SELECTING A COMMUNICATION FREQUENCY BAND AMONG THE GUARD BAND FREQUENCY BANDS OF THE BWA NETWORK FOR COMMUNICATION WITH THE MSS SATELLITE ⟋1020

ESTABLISHING, BY THE UE, A COMMUNICATION LINK WITH THE MSS SATELLITE USING THE COMMUNICATION FREQUENCY BAND THAT WAS SELECTED ⟋1030

FIG. 10

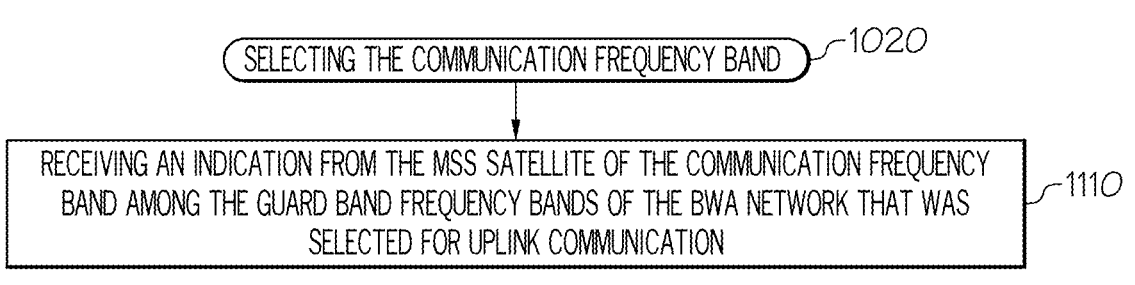

SELECTING THE COMMUNICATION FREQUENCY BAND ⟋1020

RECEIVING AN INDICATION FROM THE MSS SATELLITE OF THE COMMUNICATION FREQUENCY BAND AMONG THE GUARD BAND FREQUENCY BANDS OF THE BWA NETWORK THAT WAS SELECTED FOR UPLINK COMMUNICATION ⟋1110

FIG. 11

RECEIVING DOWNLINK SIGNALS FROM THE MSS SATELLITE OR DOWNLINK SIGNALS THAT ARE RE-BROADCAST FROM THE REPEATER STATION, BASED ON RESPECTIVE SIGNAL STRENGTHS OF THE DOWNLINK SIGNALS FROM THE MSS SATELLITE AND THE DOWNLINK SIGNALS THAT ARE RE-BROADCAST FROM THE REPEATER STATION ⟋1210

FIG. 12

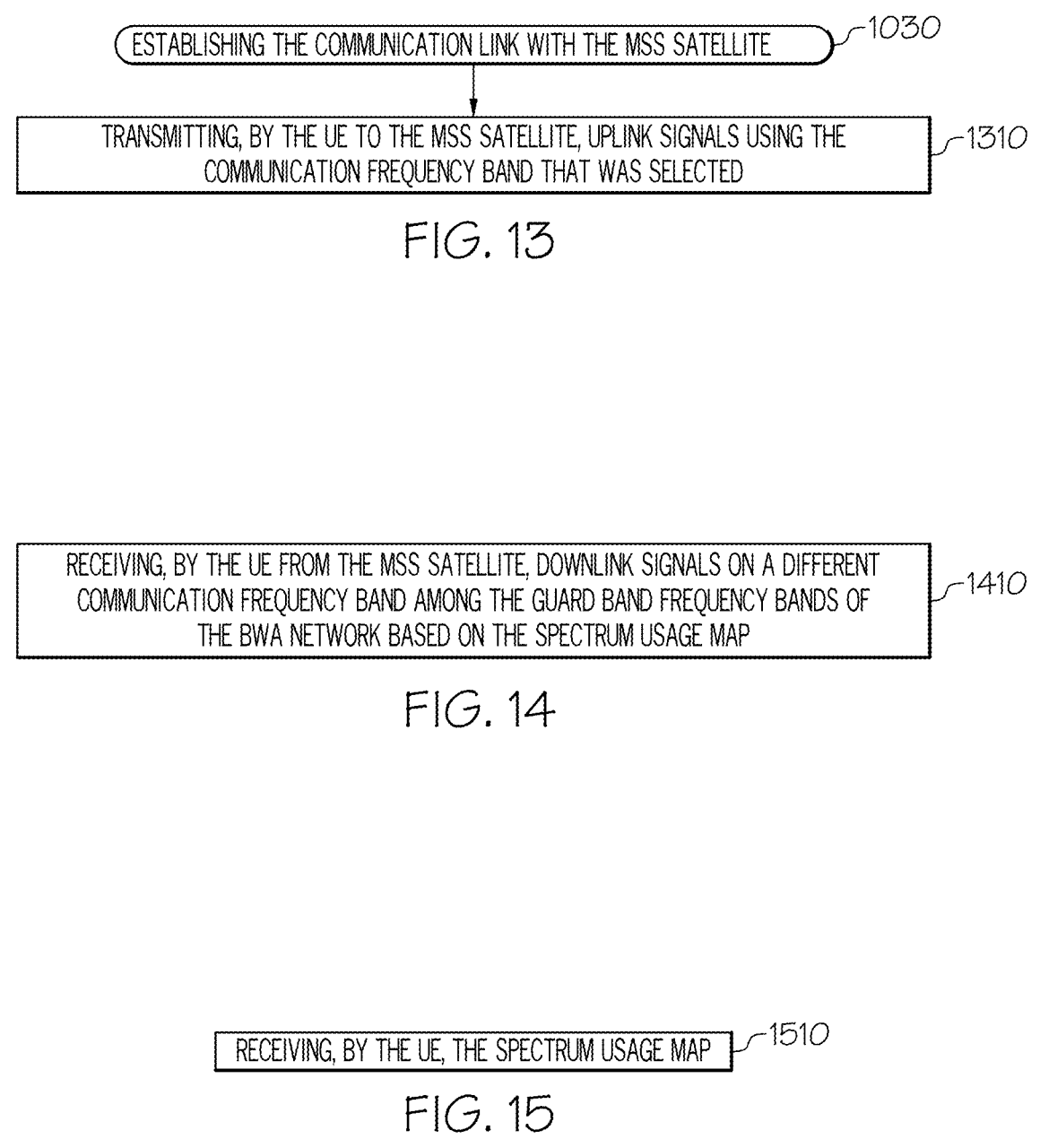

ESTABLISHING THE COMMUNICATION LINK WITH THE MSS SATELLITE ⟋1030

TRANSMITTING, BY THE UE TO THE MSS SATELLITE, UPLINK SIGNALS USING THE COMMUNICATION FREQUENCY BAND THAT WAS SELECTED ⟋1310

FIG. 13

RECEIVING, BY THE UE FROM THE MSS SATELLITE, DOWNLINK SIGNALS ON A DIFFERENT COMMUNICATION FREQUENCY BAND AMONG THE GUARD BAND FREQUENCY BANDS OF THE BWA NETWORK BASED ON THE SPECTRUM USAGE MAP ⟋1410

FIG. 14

RECEIVING, BY THE UE, THE SPECTRUM USAGE MAP ⟋1510

FIG. 15

METHODS AND DEVICES TO GENERATE A SPECTRUM UTILIZATION MAP FOR DETERMINING USE OF RADIO SPECTRUM GUARD BANDS FOR A MOBILE SATELLITE SERVICE NETWORK

BACKGROUND

Various embodiments described herein relate to methods, devices, and computer program products for communication networks, and more particularly to wireless communication networks that include satellite communication.

Mobile Satellite Service (MSS) Networks for wireless user equipment (UEs), the Internet, Internet of Things (IoT) devices and many other applications are growing in coverage and usage scenarios. Networks using thousands of Low Earth Orbit (LEO) satellites are planned for launch. These MSS networks are to be used in areas where there is little or no coverage provided by terrestrial networks, such as wired or wireless networks. Wired networks are more available in populated areas using cable, fiber, or fixed networks. In less populated areas, there may be limited or no available terrestrial networks. In such areas, an MSS network, which can directly connect to the UEs and other applications in use, such as farming or transportation, is predicted to achieve widespread use.

Radio spectrum is a natural resource that is in limited supply. An efficient use of radio spectrum is, therefore, highly desirable.

SUMMARY

Various embodiments of the present invention are directed to a method of allocating spectrum by a Mobile Satellite Service (MSS) satellite to a User Equipment (UE). The method includes monitoring radio spectrum designated as guard bands of a terrestrial Broadband Wireless Access (BWA) network to generate a spectrum usage map of guard band frequencies of the guard bands. The spectrum usage map includes available guard band frequency bands including unlicensed frequency bands. The method includes selecting a guard band or a sub-band within the available guard band frequency bands for uplink communication based on the spectrum usage map, and receiving, by the MSS satellite from the UE, uplink signals on the guard band or the sub-band that was selected.

According to some embodiments, the method may further include transmitting, by the MSS satellite to the UE, an indication of the guard band or the sub-band that was selected for uplink communication. According to some embodiments, the spectrum usage map may include a spectrum usage map in a spot beam of the MSS satellite.

According to some embodiments, the spectrum usage map may include a spectrum usage map in a coverage area of a repeater station associated with the MSS satellite. The coverage area of the repeater station associated with the MSS satellite may be smaller than a coverage area of a spot beam of the MSS satellite. The repeater station may be configured to maintain a connection with the MSS satellite, receive downlink signals from the MSS satellite, and re-broadcast the downlink signals to the UE.

According to some embodiments, the monitoring radio spectrum may include using a sounding signal by the MSS satellite to determine power flux density in the unlicensed frequency bands of the available guard band frequency bands. The method may further include receiving, by the UE from the MSS satellite, downlink signals on a different guard band or different sub-band of the BWA network based on the spectrum usage map. Sub-bands within the guard band may be pre-designated or dynamically assigned. The method may further include transmitting, by the MSS satellite, the spectrum usage map for use by the UE.

According to some embodiments, monitoring radio spectrum may include receiving, by the MSS satellite, sounding signals in the guard bands of the terrestrial BWA network from one or more UEs including the UE, and measuring respective signal strengths of the signals in the guard bands of the terrestrial BWA network from the one or more UEs. The guard band may be a frequency band between a terrestrial uplink frequency band and a terrestrial downlink frequency band. The guard band or the sub-band may be selected based on a received noise power, allowed transmit power, and/or link power budget.

Various embodiments may be directed towards a method of communication by a User Equipment (UE) in a communication network served by a Mobile Satellite Service (MSS) satellite. The method includes receiving, by the UE, a spectrum usage map including guard band frequency bands of a terrestrial Broadband Wireless Access (BWA) network including unlicensed frequency bands available for use by the UE. The method includes selecting a communication frequency band among the guard band frequency bands of the BWA network for communication with the MSS satellite, and establishing, by the UE, a communication link with the MSS satellite using the communication frequency band that was selected.

According to some embodiments, the selecting the communication frequency band may include receiving an indication from the MSS satellite of the communication frequency band among the guard band frequency bands of the BWA network that was selected for uplink communication. The communication frequency band may include a guard band or a sub-band of the terrestrial BWA network.

According to some embodiments, the spectrum usage map may include a spectrum usage map in a spot beam of the MSS satellite. The spectrum usage map may include a spectrum usage map in a coverage area of a repeater station associated with the MSS satellite. The coverage area of the repeater station associated with the MSS satellite may be smaller than a coverage area of a spot beam of the MSS satellite.

According to some embodiments, the UE may further be receiving downlink signals from the MSS satellite or downlink signals that are re-broadcast from the repeater station, based on respective signal strengths of the downlink signals from the MSS satellite and the downlink signals that are re-broadcast from the repeater station. According to some embodiments, the establishing the communication link with the MSS satellite may include transmitting, by the UE to the MSS satellite, uplink signals using the communication frequency band that was selected. The method may further include receiving, by the UE from the MSS satellite, downlink signals on a different communication frequency band among the guard band frequency bands of the BWA network based on the spectrum usage map. The method may further include receiving, by the UE, the spectrum usage map. The guard band frequency bands may include frequency bands between a terrestrial uplink frequency band and a terrestrial downlink frequency band.

Various embodiments may be directed towards a wireless electronic device associated with a Mobile Satellite Service (MSS) satellite. The wireless electronic device is configured to allocate spectrum to a User Equipment (UE) and includes a transceiver and a processor coupled to a memory. The memory is configured to store instructions that when executed by the processor cause the processor to perform operations including monitoring radio spectrum designated as guard bands of a terrestrial Broadband Wireless Access (BWA) network to generate a spectrum usage map of guard band frequencies of the guard bands. The spectrum usage map includes available guard band frequency bands including unlicensed frequency bands. The operations include selecting a guard band or a sub-band within the available guard band frequency bands for uplink communication based on the spectrum usage map, and receiving, by the MSS satellite from the UE, uplink signals on the guard band or the sub-band that was selected.

Various embodiments may be directed towards a wireless electronic device associated with a User Equipment (UE) in a communication network served by a Mobile Satellite Service (MSS) satellite. The wireless electronic device includes a transceiver and a processor coupled to a memory. The memory is configured to store instructions that when executed by the processor cause the processor to perform operations including receiving, by the UE, a spectrum usage map including guard band frequency bands of a terrestrial Broadband Wireless Access (BWA) network including unlicensed frequency bands available for use by the UE. The operations include selecting a communication frequency band among the guard band frequency bands of the BWA network for communication with the MSS satellite, and establishing, by the UE, a communication link with the MSS satellite using the communication frequency band that was selected.

BRIEF DESCRIPTION OF THE DRAWINGS

FIGS. 5 to 15 are flowcharts illustrating operations for allocating spectrum of a MSS satellite to a UE, according to some embodiments of the present inventive concepts.

DETAILED DESCRIPTION

Figure 1:
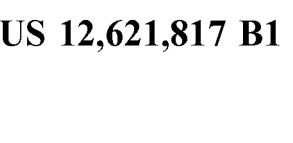
FIG. 1 is a diagram illustrating Mobile Satellite Service (MSS) satellite serving User Equipment (UEs), according to some embodiments of the present inventive concepts.

Terrestrial mobile service coverage, such as cellular networks, may extend around population centers, but rural and less dense areas may not have adequate terrestrial mobile service. Vast areas of the globe are not covered by cellular mobile networks. There is a significant interest in providing mobile services to these uncovered areas using a standard user equipment (UE). Beyond UEs, this service, according to embodiments described herein, may also have other applications such as IoT, land transportation, and marine transportation.

Methods and devices are provided herein to determine usage of guard bands in radio spectrum in a MSS system. These guard bands may be used by a system for communication to directly connect a UE to a MSS satellite or when communicating with a repeater station between the MSS satellite and the UE. Satellite radio spectrum may be shared with terrestrial Broadband Wireless Access (BWA) radio spectrum. Furthermore, satellite communications may use unlicensed spectrum for communication, in some circumstances. Spectrum may be used for Mobile Satellite Service (MSS) uplink (earth to space) and downlink (space to earth).

Licensed spectrum around the world is limited. However, there is significant allocation of unlicensed spectrum which may be used in conjunction with limited, licensed spectrum to provide Direct to Device (DtD) service for voice, data, messaging, video, and other services. Techniques described herein apply to using unlicensed bands for guard bands, depending on network configuration.

A MSS space network is capable of monitoring the utilization of radio spectrum in real time in its coverage area, including frequency bands in use and signal quality. The MSS space network may be capable of using portions of the licensed spectrum and other bands outside of the license spectrum which may be unlicensed radio spectrum bands or licensed to third parties, depending on the antennas and payload available on the satellite. With the extensive use of radio spectrum for a wide variety of applications, there may be a need for the use of guard bands to avoid inter-application interference. These guard bands do not have spectrum allocated thereto, as buffers between services are not specifically assigned spectrum by the FCC, but the need for such buffers may be recognized to effectively manage communications and thus may be assigned by regulatory agencies in various geographical areas after extensive input from users and industry groups. These guard bands, in many cases, may be allowed to be used by low power devices such as user equipment, IoT devices, and/or sensors and for use in mobile vehicles on an unlicensed basis.

Conventional wireless networks may use unlicensed spectrum by listening before transmitting, or by transmitting and then taking action if later determining that a collision of the transmission has occurred. However, these techniques may be inefficient with high overhead and may be ineffective in scenarios with many user equipment devices (UEs) trying to communicate.

Mobile Satellite Service networks may have limitations because of the transmit/receive antenna arrays, power limitations, and the licensing rules for radio spectrum in different geographical areas. A vast majority of radio spectrum is underutilized across most of the globe, especially outside of population centers. Discussed herein are methods to enable efficient use of radio spectrum that is licensed, unlicensed, and/or licensed to third parties for use by a MSS network in various spot beams from the MSS satellite. A satellite may be designed with a capability to monitor the bands of the radio spectrum to create a real time map of spectrum utilization.

A guard band typically may be an unused portion of spectrum, time, or a virtual area that acts as a buffer to prevent interference between adjacent signals. In other words, a guard band may be frequency range between communication channels to prevent or reduce signal overlap. A guard band is typically needed between the uplink frequency band and the downlink frequency band to avoid interference between uplink signals and downlink signals. This is particularly true when using unlicensed spectrum. These guard bands may not be assigned by the FCC, but may be needed to effectively manage communications by various network providers. Various embodiments described herein may arise from recognition that a spectrum usage map may be used to determine when transmission is possible and the guard band frequencies to use for transmission. According to various embodiments described herein, an effective way in which the guard band spectrum may be used by UEs and other e-services for a MSS uplink (earth to space) without causing interference is described. Radio spectrum guard bands may be used for MSS uplink communications. Various embodiment describe allowing low-power devices to use these guard bands for satellite communications. The uplink case may be a simpler case, since the UE may be able to determine interference in the vicinity based on the spectrum usage map generated by UE measurements. The satellite may use information from the UEs regarding signals from other UEs in the area to determine the spectrum usage map.

If a terrestrial uplink frequency band is re-used for the MSS satellite uplink, only other UEs that are near the UE and are re-using the terrestrial uplink frequency band for the uplink to the MSS satellite would be subjected to interference.

The MSS uplink will likely not see interference from terrestrial downlink usage since the terrestrial downlink signals are not directed upwards towards the satellite. The MSS downlink includes signals sent to the whole spot beam where UEs are present, such that interference would occur to UEs across the entire spot beam.

An MSS satellite may monitor the spectrum usage and create a Spectrum Usage Map (SUM) and may direct the UE (i.e., an MSS user UE) to use the guard band for the user uplink (UL) or a sub-band within the guard band. These sub-bands can be assigned in a pre-designated manner or may be dynamically assigned. The MSS satellite may select the guard band or a sub-band within the guard band based on the received noise level within that frequency band, based on allowed transmit power levels, and/or based on other criteria such as link budget such that the guard band or the sub-band within the guard band are suited for the MSS UE to transmit. The UE may perform the proximity analysis to determine which guard band or a sub-band within the list of suitable bands provided by the spectrum usage map are not going to cause interference to other unlicensed users in the guard band. The UE may then transmit signals to the MSS satellite on the selected uplink band. The UE may receive the MSS satellite signal on the MSS downlink designated in the spectrum usage map for the use by the UE.

In the downlink, all UEs in the spot beam may be susceptible to interference during frequency re-use. For the downlink, if a repeater station is available in the vicinity of the UE, the repeater station can be used to improve selection of guard band frequencies for the downlink. A repeater station behaves similar to a backhaul station and will continuously maintain a connection to at least one satellite in the MSS system. If the repeater station is available in the vicinity of the UE, then the satellite may send downlink signals to the repeater station. The repeater station then re-broadcasts these signals and maintains the power flux density. The objective would be to maintain power flux density on the ground within the range, as not to cause interference to other users which may not be part of the network of the satellite. The power flux density (PFD) refers to the amount of radio power passing through a unit area, typically measured in Watts per square meter (W/m$^2$) or dBW/m$^2$. In satellite communication, the power flux density may be important for ensuring compatibility and preventing interference between different satellite systems with terrestrial services.

The UE may receive the downlink signals from the repeater station, but may be unaware that the downlink signals are not directly from the satellite, but from the repeater station. The downlink signals received by the UE from the repeater station may be greater in signal strength than the downlink signals received by the UE directly from the satellite. In other words, the repeater station provides stronger signals to the UE when using the guard band frequency in the downlink directly from the satellite.

Guard bands may be used by the satellite for downlink communication with the UE. A sounding signal may be sent to the UE by the satellite in order to ensure meeting regulatory requirements or technical requirements. Once the guard band frequencies that are determined to be suitable for satellite downlink use based on regulatory requirements, these guard band frequencies may be used for downlink communication. In some embodiments, the satellite may make use of channel sounding methods. Several UEs in a spot beam in the coverage area of the satellite may be directed to send a signal back to the MSS satellite with the received signal strength. Using a large number of such transmissions, spot beam SI may calibrate the impact of man-made structures and natural elements during the real-life use of its network to connect UEs on the ground.

In some embodiments, the UE will monitor the downlink spectrum in its vicinity. The UE may then communicate to the MSS satellite in frequency sub-bands that are available. The MSS satellite signal sends a channel sounding signal to the UE and receives or listens for the channel sounding signals from the UE. Based on the knowledge of the geographical location of the UE and information from the channel sounding signals, the MSS satellite may send downlink data to the UE using massive MIMO (Multiple Input, Multiple Output) techniques. Massive MIMO is a wireless technology that uses a large number of antennas at a satellite to serve many users simultaneously. The MSS satellite is thus able to direct signals more closely to the vicinity of the UE and reduce interference to other UEs in the same spot beam.

For the downlink (i.e., space to earth) use for guard bands, the UEs may report activity in their vicinity of received signals in the guard band and/or in sub-bands within the guard band. A spectrum usage map may be generated based on this information. The MSS system perform channel sounding for a given UE in the guard band using licensed, unlicensed or guard band spectrum to determine the power flux density to meet regulatory requirements for use of the guard band for the downlink. In some embodiments, the MSS system may use a ground-based transmitter as a repeater, if a repeater is available to communicate with the UE. Use of the repeater may reduce the power flux density that is needed to meet regulatory requirements for non-interference with terrestrial communications. Available spectrum may be assigned for the MSS downlink communication. The UE may receive the MSS satellite signal on the MSS downlink designated in the Spectrum Usage Map for the use by the UE.

The repeater station may have a smaller area of coverage than the spot beam coverage area of the satellite. A repeater station may keep its own spectrum usage map of the coverage area of the repeater station. The repeater station may select frequency sub-bands within the guard band frequency band and inform the satellite of the selected frequency sub-bands. The satellite may transmit directly to a particular UE in a guard band frequency based on the spectrum usage map, or may transmit signals to the repeater using the selected frequency sub-bands of the guard band frequency band.

If the UE is in the coverage area of the repeater, then the satellite may make a decision whether to send signals destined for the UE to the repeater or directly to the UE.

Various embodiments describe a repeater station to determine the spectrum usage map in the coverage area of the repeater station, and then making a decision whether to use direct communication between the satellite and the UE or whether to communicate via a repeater. These embodiments take advantage of the repeater station having better granularity of downlink frequency use within a portion of the area of the spot beam of the satellite.

FIG. 1 is a diagram illustrating User Equipment (UEs) served by a Mobile Satellite Service (MSS) satellite and in communication with a terrestrial base station, according to some embodiments of the present inventive concepts. Referring now to FIG. 1, a MSS satellite 110 may be communicating with MSS-capable UEs 152 and 155 in a spot beam 160. The spot beam 160 may be an area covered by the MSS satellite as the satellite orbits the earth. The geographical area covered by a spot beam changes as the satellite orbits the earth. Each spot beam may cover a given geographical area at any given time. As a satellite orbits the earth, a spot beam from the satellite may move over new geographical areas and the next spot beam may cover the given geographical area. The given geographical area may be covered by a spot beam, but other spot beams may measure the spectrum usage in the area covered by the spot beam by measuring the earth to space (uplink) signal strength.

Still referring to FIG. 1, some geographical areas may include a terrestrial base station 130. UE 135 may communicate with the terrestrial base station 130 and/or may directly communicate with MSS satellite 110. An MSS Control Station may be terrestrially based and may serve as a repeater station 140 for the MSS satellite 110. Repeater station 140 may serve UEs 152 and 155 in coverage area 170, which is smaller than the coverage area of spot beam 160. The repeater station 140 may serve to conserve power for signals from the MSS satellite 110. The repeater station 140 may assist in the frequency assignment, monitor terrestrial conditions around the UEs 152 and 155, monitor unlicensed spectrum in the geographical vicinity, etc., according to various embodiments described herein. The MSS satellite 110 may communicate with a ground station 120 via a feeder link. Ground station 120 may correspond to an MSS Control Station and/or a BWA base station controller.

Still referring to FIG. 1, UEs 135, 150, and/or 152 may be in direct communication with the MSS satellite 110. For example, UE 150 may transmit an uplink signal 196 to MSS satellite 110 and receive a downlink signal 198 from the MSS satellite 110. UE 152 may transmit an uplink signal 174 to MSS satellite 110 and receive a downlink signal 172 from the MSS satellite 110. UE 152 may also transmit an uplink signal 162 to repeater station 140 and receive a downlink signal 164 from repeater station 140. Repeater station 140 may transmit an uplink signal 178 to the MSS satellite and may receive a downlink signal 176 from the MSS satellite 110. UE 155 may transmit an uplink signal 188 to terrestrial base station 130 and receive a downlink signal 186 from the terrestrial base station 130. Terrestrial base station 130 may communicate with the MSS satellite 110 via uplink signal 192 and downlink signal 194. UE 135 may directly communicate with the MSS satellite 110 via uplink signal 182 and downlink signal 184.

Figures 2, 3, 4:
FIG. 2 illustrates the use of guard bands in a terrestrial BWA network, according to some embodiments of the present inventive concepts.
FIG. 3 illustrates the use of guard bands between mobile service in a terrestrial BWA network and a Fixed Satellite Service (FSS), according to some embodiments of the present inventive concepts.
FIG. 4 illustrates the use of guard bands when multiple terrestrial BWA networks operate in a same geographical area, according to some embodiments of the present inventive concepts.

FIG. 2 illustrates the use of guard bands in a terrestrial BWA network, according to some embodiments of the present inventive concepts. Referring to FIG. 2, a terrestrial uplink frequency band may be used for communication from a UE to a terrestrial base station and a terrestrial downlink frequency band may be used for communication from the terrestrial base station to the UE. Guard band frequencies between terrestrial uplink frequency band and the terrestrial downlink frequency band may be present. According to various embodiments herein, these guard band frequency bands may be used for communication of uplink signals from the UE to the MSS satellite.

FIG. 3 illustrates the use of guard bands between mobile service in a terrestrial BWA network and a Fixed Satellite Service (FSS), according to some embodiments of the present inventive concepts. Referring to FIG. 3, a terrestrial uplink frequency band may be allocated for terrestrial use, such as cellular mobile service. FSS may be used in the downlink frequency bands for services such as downlink video services. These downlink frequency bands for FSS may include C-band allocation for distribution of video for FSS. Time division duplexing (TDD) allocation may occur in both the uplink and the downlink in a specific frequency band. Guard band frequencies between terrestrial uplink mobile service and the FSS downlink frequency band may be present. For example, in this non-limiting example, the guard band may have a bandwidth of 20 MHz.

FIG. 4 illustrates the use of guard bands when multiple terrestrial BWA networks operate in a same geographical area, according to some embodiments of the present inventive concepts. Referring to FIG. 4, the multiple terrestrial BWA networks may not be coordinated, since they may belong to competing service providers. For example, two terrestrial systems may be using TDD communication in the uplink and downlink from competing providers. Guard band frequencies may thus be needed between the two terrestrial BWA network communication bands.

Referring to FIG. 5, a flowchart is provided illustrating operations for allocating spectrum by a Mobile Satellite Service (MSS) satellite to a User Equipment (UE), according to some embodiments. Operations begin at block 510 where radio spectrum designated as guard bands of a terrestrial Broadband Wireless Access (BWA) network is monitored to generate a spectrum usage map of guard band frequencies of the guard bands. The spectrum usage map includes available guard band frequency bands including unlicensed frequency bands. According to some embodiments, the spectrum usage map may include a spectrum usage map in a spot beam of the MSS satellite. A spot beam refers to a focused beam of radio frequency energy transmitted from the satellite antenna toward a specific geographic area on Earth. The spectrum usage map for a particular spot beam reflects the spectrum utilization by UEs within that spot beam's coverage area. According to other embodiments, the spectrum usage map may include a spectrum usage map in a coverage area of a repeater station associated with the MSS satellite. The coverage area of the repeater station may be smaller than a coverage area of a spot beam of the MSS satellite, allowing for more granular spectrum usage information for the area covered by the repeater station. The repeater station may be configured to maintain a connection with the MSS satellite, receive downlink signals from the MSS satellite, and re-broadcast the downlink signals to the UE. The repeater station enables more localized spectrum management and can improve signal strength for UEs within its coverage area. The monitoring of radio spectrum at block 510 may be performed using various techniques. According to some embodiments, the monitoring may include using a sounding signal by the MSS satellite to determine power flux density in the unlicensed frequency bands of the available guard band frequency bands. The sounding signal may allow the satellite to assess the radio environment and determine which guard bands or sub-bands are suitable for use. This approach may leverage measurements from UEs distributed throughout the coverage area to build an accurate spectrum usage map.

Still referring to FIG. 5, At block 520, a guard band or a sub-band within the available guard band frequency bands is selected for uplink communication based on the spectrum usage map. The guard band may be a frequency band between a terrestrial uplink frequency band and a terrestrial downlink frequency band. According to some embodiments, the guard band or the sub-band is selected based on a received noise power, allowed transmit power, and/or link power budget. These criteria help ensure that the selected guard band or sub-band provides adequate link quality while avoiding interference with other users. The sub-bands within the guard band may be pre-designated or dynamically assigned, providing flexibility in spectrum allocation based on network conditions and requirements. At block 530, the MSS satellite receives uplink signals from the UE on the guard band or the sub-band that was selected.

Referring to FIG. 6, a flowchart is provided illustrating operations for transmitting an indication of the selected guard band or sub-band to the UE, according to some embodiments. At block 610, the MSS satellite transmits to the UE an indication of the guard band or the sub-band that was selected for uplink communication. This indication allows the UE to know which guard band or sub-band to use when transmitting uplink signals to the MSS satellite. The operations of FIG. 6 may be performed after the selection operation of block 520 of FIG. 5.

Referring to FIG. 7, a flowchart is provided illustrating operations for downlink communication, according to some embodiments. At block 710, the UE receives from the MSS satellite downlink signals on a different guard band or different sub-band of the BWA network based on the spectrum usage map. The use of a different guard band or sub-band for downlink than for uplink allows for more efficient spectrum utilization and can help avoid interference between uplink and downlink transmissions. The spectrum usage map may indicate which guard bands or sub-bands are suitable for downlink communication based on spectrum conditions in the coverage area.

Referring to FIG. 8, a flowchart is provided illustrating operations for transmitting the spectrum usage map to the UE, according to some embodiments. At block 810, the MSS satellite transmits the spectrum usage map for use by the UE. The spectrum usage map provides the UE with information about available guard band frequency bands, including both licensed and unlicensed frequency bands that may be used for communication with the MSS satellite. The UE may use this spectrum usage map to select appropriate frequency bands for uplink transmission and to expect downlink transmissions on designated frequency bands.

Referring to FIG. 9, a flowchart is provided illustrating operations for monitoring radio spectrum by receiving sounding signals from UEs, according to some embodiments. Operations begin at block 510 where monitoring radio spectrum occurs. At block 910, the MSS satellite receives sounding signals in the guard bands of the terrestrial BWA network from one or more UEs including the UE.

These sounding signals allow the MSS satellite to assess spectrum usage and interference levels in the guard bands. At block 920, the MSS satellite measures respective signal strengths of the signals in the guard bands of the terrestrial BWA network from the one or more UEs. By measuring the signal strengths from multiple UEs across the guard bands, the MSS satellite can generate an accurate spectrum usage map that identifies which guard bands or sub-bands are suitable for use by UEs for uplink communication. Guard bands or sub-bands with lower measured signal strengths may indicate less interference and may be more suitable for allocation to UEs for MSS uplink communication.

Referring to FIG. 10, a flowchart is provided illustrating a method of communication by a User Equipment (UE) in a communication network served by a Mobile Satellite Service (MSS) satellite, according to some embodiments. Operations begin at block 1010 where the UE receives a spectrum usage map including guard band frequency bands of a terrestrial Broadband Wireless Access (BWA) network including unlicensed frequency bands available for use by the UE. The spectrum usage map provides the UE with information about which guard bands or sub-bands within the guard bands are available for use. According to some embodiments, the spectrum usage map may include a spectrum usage map in a spot beam of the MSS satellite, providing spectrum information specific to the spot beam in which the UE is located. According to some embodiments, the spectrum usage map may include a spectrum usage map in a coverage area of a repeater station associated with the MSS satellite. The coverage area of the repeater station may be smaller than a coverage area of a spot beam of the MSS satellite, allowing for more precise spectrum usage information within the repeater's localized coverage area.

Still referring to FIG. 10, at block 1020, the UE selects a communication frequency band among the guard band frequency bands of the BWA network for communication with the MSS satellite. The selection may be performed autonomously by the UE based on the spectrum usage map, or may be based on an indication received from the MSS satellite, as discussed further with respect to FIG. 11. The guard band frequency bands may include frequency bands between a terrestrial uplink frequency band and a terrestrial downlink frequency band, which are designated as guard bands in the terrestrial BWA network but may be utilized for MSS communication. At block 1030, the UE establishes a communication link with the MSS satellite using the communication frequency band that was selected. Establishing the communication link may include transmitting uplink signals to the MSS satellite on the selected communication frequency band.

Referring to FIG. 11, a flowchart is provided illustrating operations for selecting a communication frequency band based on an indication from the MSS satellite according to some embodiments. Operations begin at block 1020 where the UE is in the process of selecting the communication frequency band. At block 1110, the UE receives an indication from the MSS satellite of the communication frequency band among the guard band frequency bands of the BWA network that was selected for uplink communication. The communication frequency band includes a guard band or a sub-band of the terrestrial BWA network. In some embodiments, the MSS satellite performs the selection of the specific guard band or sub-band and directs the UE to use the selected frequency band, rather than having the UE autonomously select the frequency band. However, in some embodiments, the UE, a repeater station, or a control station may make decisions regarding which frequencies to use.

Referring to FIG. 12, a flowchart is provided illustrating operations for receiving downlink signals from the MSS satellite or from a repeater station, according to some embodiments. At block 1210, the UE receives downlink signals from the MSS satellite or downlink signals that are re-broadcast from the repeater station, based on respective signal strengths of the downlink signals from the MSS satellite and the downlink signals that are re-broadcast from the repeater station. The repeater station may be associated with the MSS satellite and may maintain a connection with the MSS satellite. The repeater station receives downlink signals from the MSS satellite and re-broadcasts the downlink signals to the UE. The coverage area of the repeater station may be smaller than a coverage area of a spot beam of the MSS satellite. The downlink signals that are re-broadcast from the repeater station may have greater signal strength at the UE than downlink signals received directly from the MSS satellite, particularly when the UE is within the coverage area of the repeater station. The UE may automatically select to receive from the stronger signal source, or may be directed by the network to receive from a particular source. This approach may allow for improved signal quality and more efficient use of guard bands for downlink communication, as the repeater station can provide localized coverage with better signal characteristics than direct satellite transmission. In some embodiments, the UE may be unaware that the downlink signals are received from the repeater station, and not directly from the MSS satellite.

Referring to FIG. 13, a flowchart is provided illustrating operations for transmitting uplink signals, according to some embodiments. Operations begin at block 1030 where the UE is establishing the communication link with the MSS satellite. At block 1310, the UE transmits to the MSS satellite uplink signals using the communication frequency band that was selected. The uplink signals are transmitted on the guard band or sub-band that was selected for uplink communication, which may be a guard band between terrestrial uplink and downlink frequency bands of the terrestrial BWA network. According to some embodiments, the communication frequency band used for uplink transmission may be a guard band or a sub-band of the terrestrial BWA network. The guard band frequency bands used for uplink may include frequency bands between a terrestrial uplink frequency band and a terrestrial downlink frequency band. By transmitting on guard bands of the terrestrial BWA network, the UE can communicate with the MSS satellite without causing interference to terrestrial BWA users, provided that the selected guard band or sub-band has been determined to be suitable based on the spectrum usage map. The transmission power and other parameters may be controlled to ensure compliance with regulatory requirements and to avoid interference with other users of the guard bands.

Referring to FIG. 14, a flowchart is provided illustrating operations for receiving downlink signals on a different communication frequency band according to some embodiments. At block 1410, the UE receives from the MSS satellite downlink signals on a different communication frequency band among the guard band frequency bands of the BWA network based on the spectrum usage map. By using different guard bands or sub-bands for uplink and downlink communication, interference between uplink and downlink transmissions can be reduced. The spectrum usage map may indicate which guard band or sub-band is designated for downlink communication to the UE, which may be different from the guard band or sub-band used by the UE for uplink transmission. This separation of uplink and downlink frequencies is particularly beneficial when using guard bands, as it prevents the uplink signals from interfering with the downlink reception at the UE. According to some embodiments, the different communication frequency band for downlink may be selected by the MSS satellite based on spectrum conditions indicated in the spectrum usage map. The guard band frequency bands used for downlink may include frequency bands between a terrestrial uplink frequency band and a terrestrial downlink frequency band. The use of separate guard bands for uplink and downlink allows the MSS system to improve spectrum usage while maintaining regulatory compliance and avoiding interference with terrestrial BWA network operations.

Referring to FIG. 15, a flowchart is provided illustrating operations for receiving the spectrum usage map, according to some embodiments. At block 1510, the UE receives the spectrum usage map. The spectrum usage map may be received directly from the MSS satellite or may be received indirectly from the MSS satellite via a terrestrial BWA base station. The spectrum usage map provides the UE with information about available guard band frequency bands for communication with the MSS satellite, allowing the UE to participate in the frequency selection process or to confirm the frequency bands assigned by the MSS satellite. The spectrum usage map may be transmitted as shown in FIG. 8, where the MSS satellite transmits the spectrum usage map for use by the UE. According to some embodiments, the spectrum usage map includes information about both licensed and unlicensed frequency bands within the guard bands. The spectrum usage map may also indicate which guard bands or sub-bands are suitable for uplink communication and which are suitable for downlink communication, based on spectrum monitoring performed by the MSS satellite or repeater stations. The UE uses this spectrum usage map information to enable efficient utilization of guard band spectrum while avoiding interference with terrestrial BWA network users and other MSS users.

Figure 16:
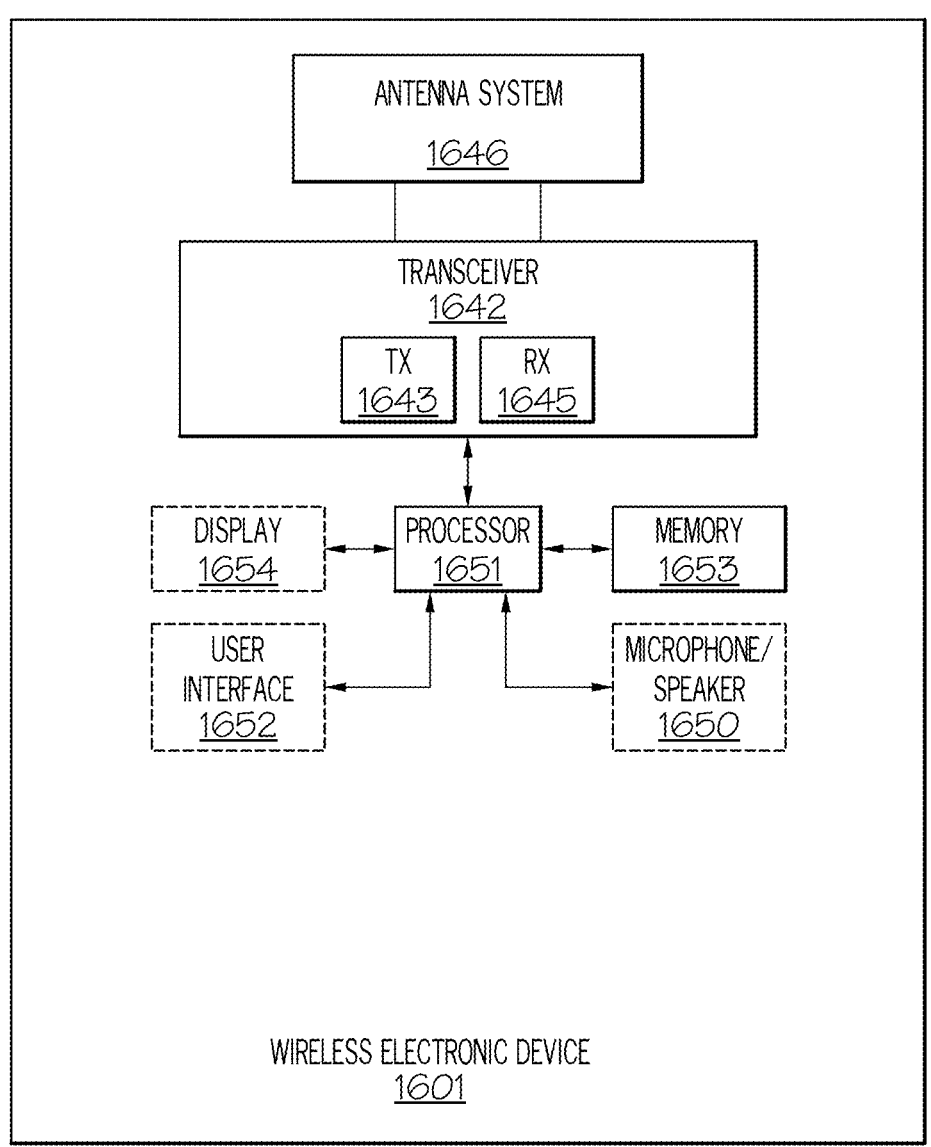
FIGS. 16 to 18 are block diagrams of various wireless electronic devices, according to some embodiments of the present inventive concepts.
Figure 17:
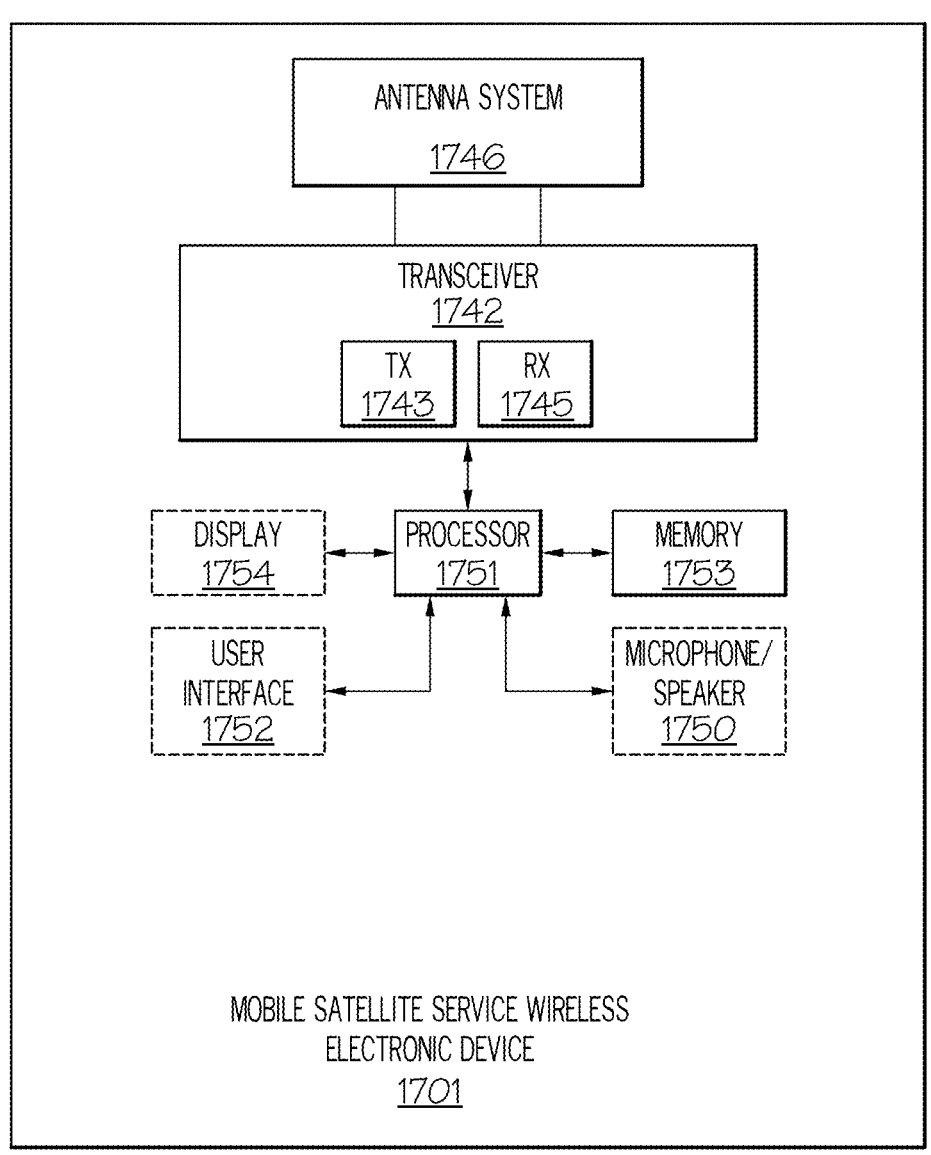
Figure 18:
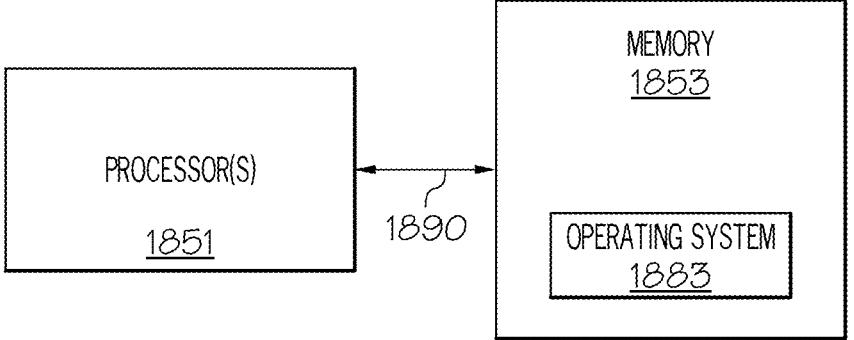

FIGS. 16, 17, and 18 are block diagrams of various electronic devices that may be used in a MSS system and/or a UE. Referring to FIG. 16, a block diagram is provided of a wireless electronic device which may correspond to one more of various elements of UEs 150, 152, 155, and/or 135, a repeater station 140, and/or a terrestrial base station 130 of FIG. 1, according to some embodiments. Referring to FIG. 17, a block diagram is provided of a Mobile Satellite Service wireless electronic device, which may correspond to one or more of various MSS network elements such as MSS satellite 110 of FIG. 1, according to some embodiments.

As illustrated in FIG. 16, a wireless electronic device 1601 may include an antenna system 1646, a transceiver 1642, a processor (e.g., processor circuit) 1651, and a memory 1653. Moreover, the wireless electronic device 1601 may optionally include a display 1654, a user interface 1652, and/or a microphone/speaker 1650. The MSS wireless electronic device 1701 of FIG. 17 may have components that operate similarly to those of wireless electronic device 1601 of FIG. 16 and thus details will not be repeated.

The transmitter portions of transceivers 1642 or 1742 of FIGS. 16 and 17 may operate similarly to one another so each will not be described separately. Referring once again to FIG. 16, a transmitter portion 1643 of the transceiver 1642 may convert information, which is to be transmitted by the wireless electronic device 1601, into electromagnetic signals suitable for radio communications. A receiver portion 1645 of the transceiver 1642 may demodulate electromagnetic signals, which are received by the wireless electronic device 1601. The transceiver 1642 may include transmit/receive circuitry (TX/RX) that provides separate communication paths for supplying/receiving RF signals to different radiating elements of the antenna system 1646 via their respective RF feeds. Accordingly, when the antenna system 1646 includes two active antenna elements, the transceiver 1642 may include transmit circuit 1643 and/or receive circuit 1645 connected to different ones of the antenna elements via the respective RF feeds. For example, the transmit/receive circuits 1643/1645 may be connected to a Wi-Fi antenna, satellite antenna, MIMO antennas, a close/short-range (e.g., a Near-Field Communication (NFC), or BLUETOOTH®) antenna, cellular antenna, satellite antenna, or a 3G, 4G, LTE, or 5G antenna. Moreover, the antenna system 1646 and/or the transceiver 1642 may include a GPS receiver.

Referring still to FIG. 16, the memory 1653 may store computer program instructions that, when executed by the processor circuit 1651, carry out operations of the wireless electronic device 1601. In some embodiments, the memory 1653 can be a non-transitory computer readable storage medium including computer readable program code therein that when executed by the processor 1651 causes the processor 1651 to perform a method described herein. As an example, the memory 1653 may store an application which can perform the operations illustrated in various blocks of the flow charts of FIGS. 5 to 15. The memory 1653 can be, for example, a non-volatile memory, such as a flash memory, that retains the stored data while power is removed from the memory 1653. The memory 1753 or FIG. 17 and memory 1853 of FIG. 18 operate similarly to that of the memory 1653 of FIG. 16 and thus will not be discussed separately.

Referring once again to FIG. 16, wireless electronic device 1601 may be associated with a UE 150, 152, 155, and/or 135 in a communication network served by MSS satellite 110. The wireless electronic device 1601 includes transceiver 1642 and a processor 1651 coupled to memory 1653, which is configured to store instructions that cause the processor 1651 to perform operations including receiving, by the UE, a spectrum usage map comprising guard band frequency bands of a terrestrial Broadband Wireless Access (BWA) network comprising unlicensed frequency bands available for use by the UE, selecting a communication frequency band among the guard band frequency bands of the BWA network for communication with the MSS satellite, and establishing, using the transceiver 1642, a communication link with the MSS satellite 110 on the communication frequency band that was selected.

Referring once again to FIG. 17, MSS wireless electronic device 1701 may be associated with a MSS satellite 110 of FIG. 1. Wireless electronic device 1701 may be configured to allocate spectrum to UE 150, 152, 155, and/or 135 of FIG. 1. The processor 1751 is coupled to memory 1753, which is configured to store instructions that cause the processor 1751 to perform operations including monitoring, by the MSS satellite 110, radio spectrum in a coverage area of the MSS satellite 110 that is designated as guard bands of a terrestrial Broadband Wireless Access (BWA) network to generate a spectrum usage map of guard band frequencies of the guard bands, wherein the spectrum usage map comprises available guard band frequency bands comprising unlicensed frequency bands, selecting a guard band or a sub-band within the available guard band frequency bands for uplink communication based on the spectrum usage map, and receiving, by the MSS satellite 110 from the UE 150, 152, 155, and/or 135 of FIG. 1, uplink signals on the guard band or the sub-band that was selected.

FIG. 18 illustrates a block diagram of an example processor 1851 and memory 1853 that may be used in accordance with various embodiments of the present inventive concepts. The processor 1851 communicates with the memory 1853 via an address/data bus 1890. The processor 1851 may be, for example, a commercially available or custom microprocessor. Moreover, the processor 1851 may include multiple processors. The memory 1853 is representative of the overall hierarchy of memory devices containing the software and data used to implement various functions as described herein. The memory 1853 may include, but is not limited to, the following types of devices: cache, ROM, PROM, EPROM, EEPROM, flash, Static RAM (SRAM), and Dynamic RAM (DRAM).

Still referring to FIG. 18, the memory 1853 may hold various categories of software and data, such as an operating system 1883. The processor 1851 and memory 1853 may correspond to any of the processors 1651 or 1751 and memories 1653 and 1753 of wireless electronic device 1601, or MSS wireless electronic device 1701 of FIG. 16 and/or FIG. 17. Accordingly, the operating system 1883 may control operations of the devices 1601 and/or 1701. In particular, the operating system 1883 may manage the resources of corresponding devices 1601 and/or 1701 and may coordinate execution of various programs performing operations described herein by the processor 1851.

Various embodiments of the inventive concepts address the challenge of efficient radio spectrum utilization in MSS networks by leveraging underutilized guard bands from terrestrial BWA networks. An MSS satellite system may actively monitor radio spectrum to create real-time spectrum usage maps identifying available guard band frequencies, including unlicensed frequency bands, between terrestrial uplink and downlink channels. Based on these maps, the MSS satellite may intelligently select and allocate specific guard bands or sub-bands for uplink and downlink communication with UEs, considering factors such as received noise power, allowed transmit power, and link power budget. The system may employ sounding signals from satellites and/or UEs to assess spectrum conditions and power flux density requirements. Terrestrially-based repeater stations that maintain smaller coverage areas compared to satellite spot beams may be used, enabling more granular spectrum management and stronger signal delivery to UEs while maintaining regulatory compliance for power flux density. By dynamically utilizing these typically unused guard band frequencies without causing interference to terrestrial services, embodiments described herein enable direct-to-device satellite connectivity in areas lacking terrestrial coverage, effectively expanding the usable spectrum for MSS networks through opportunistic reuse of frequency bands that would otherwise remain idle or underutilized.

FURTHER DEFINITIONS AND EMBODIMENTS

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination. Many variations and modifications can be made to the embodiments without substantially departing from the principles described herein. All such variations and modifications are intended to be included herein within the scope.

That which is claimed is:

1. A method of allocating spectrum by a Mobile Satellite Service (MSS) satellite to a User Equipment (UE), the method comprising:

monitoring radio spectrum designated as guard bands of a terrestrial Broadband Wireless Access (BWA) network to generate a spectrum usage map of guard band frequencies of the guard bands, wherein the spectrum usage map comprises available guard band frequency bands comprising unlicensed frequency bands;

selecting a guard band or a sub-band within the available guard band frequency bands for uplink communication based on the spectrum usage map; and receiving, by the MSS satellite from the UE, uplink signals on the guard band or the sub-band that was selected.

2. The method of claim 1, further comprising:

transmitting, by the MSS satellite to the UE, an indication of the guard band or the sub-band that was selected for uplink communication.

3. The method of claim 1, wherein the spectrum usage map comprises a spectrum usage map in a spot beam of the MSS satellite.

4. The method of claim 1, wherein the spectrum usage map comprises a spectrum usage map in a coverage area of a repeater station associated with the MSS satellite.

5. The method of claim 4, wherein the coverage area of the repeater station associated with the MSS satellite is smaller than a coverage area of a spot beam of the MSS satellite.

6. The method of claim 4, wherein the repeater station is configured to maintain a connection with the MSS satellite, receive downlink signals from the MSS satellite, and re-broadcast the downlink signals to the UE.

7. The method of claim 1, wherein the monitoring radio spectrum comprises:

using a sounding signal by the MSS satellite to determine power flux density in the unlicensed frequency bands of the available guard band frequency bands.

8. The method of claim 1, further comprising:

receiving, by the UE from the MSS satellite, downlink signals on a different guard band or different sub-band of the BWA network based on the spectrum usage map.

9. The method of claim 1, wherein sub-bands within the guard band are pre-designated or dynamically assigned.

10. The method of claim 1, further comprising:

transmitting, by the MSS satellite, the spectrum usage map for use by the UE.

11. The method of claim 1, wherein monitoring radio spectrum comprises:

receiving, by the MSS satellite, sounding signals in the guard bands of the terrestrial BWA network from one or more UEs including the UE; and measuring respective signal strengths of the signals in the guard bands of the terrestrial BWA network from the one or more UEs.

12. The method of claim 1, wherein monitoring radio spectrum comprises:

listening, by the MSS satellite, for sounding signals from the UE; and transmitting, by the MSS satellite, downlink data to the UE using massive MIMO techniques.

13. The method of claim 1, wherein the guard band is a frequency band between a terrestrial uplink frequency band and a terrestrial downlink frequency band.

14. The method of claim 1, wherein the guard band or the sub-band is selected based on a received noise power, allowed transmit power, and/or link power budget.

15. A method of communication by a User Equipment (UE) in a communication network served by a Mobile Satellite Service (MSS) satellite, the method comprising:

receiving, by the UE, a spectrum usage map comprising guard band frequency bands of a terrestrial Broadband Wireless Access (BWA) network comprising unlicensed frequency bands available for use by the UE;

selecting a communication frequency band among the guard band frequency bands of the BWA network for communication with the MSS satellite; and establishing, by the UE, a communication link with the MSS satellite using the communication frequency band that was selected.

16. The method of claim 15, wherein the selecting the communication frequency band comprises:

receiving an indication from the MSS satellite of the communication frequency band among the guard band frequency bands of the BWA network that was selected for uplink communication, wherein the communication frequency band comprises a guard band or a sub-band of the terrestrial BWA network.

17. The method of claim 15, wherein the spectrum usage map comprises a spectrum usage map in a spot beam of the MSS satellite.

18. The method of claim 15, wherein the spectrum usage map comprises a spectrum usage map in a coverage area of a repeater station associated with the MSS satellite.

19. The method of claim 18, wherein the coverage area of the repeater station associated with the MSS satellite is smaller than a coverage area of a spot beam of the MSS satellite.

20. The method of claim 18, further comprising:

receiving downlink signals from the MSS satellite or downlink signals that are re-broadcast from the repeater station, based on respective signal strengths of the downlink signals from the MSS satellite and the downlink signals that are re-broadcast from the repeater station.

21. The method of claim 15, wherein the establishing the communication link with the MSS satellite comprises:
transmitting, by the UE to the MSS satellite, uplink signals using the communication frequency band that was selected.

22. The method of claim 21, further comprising:
receiving, by the UE from the MSS satellite, downlink signals on a different communication frequency band among the guard band frequency bands of the BWA network based on the spectrum usage map.

23. The method of claim 15, further comprising:
receiving, by the UE, the spectrum usage map.

24. The method of claim 15, wherein the guard band frequency bands comprise frequency bands between a terrestrial uplink frequency band and a terrestrial downlink frequency band.

25. The method of claim 15, wherein the establishing the communication link with the MSS satellite comprises:
transmitting, by the MSS satellite, sounding signals to the UE; and
transmitting, by the MSS satellite, downlink data to the UE using massive MIMO techniques, based on a response to the sounding signals.

26. A wireless electronic device associated with a Mobile Satellite Service (MSS) satellite, the wireless electronic device configured to allocate spectrum to a User Equipment (UE), the wireless electronic device comprising:
a transceiver; and
a processor coupled to a memory, wherein the memory is configured to store instructions that when executed by the processor cause the processor to perform operations comprising:

monitoring radio spectrum designated as guard bands of a terrestrial Broadband Wireless Access (BWA) network to generate a spectrum usage map of guard band frequencies of the guard bands, wherein the spectrum usage map comprises available guard band frequency bands comprising unlicensed frequency bands;

selecting a guard band or a sub-band within the available guard band frequency bands for uplink communication based on the spectrum usage map; and receiving, by the MSS satellite from the UE, uplink signals on the guard band or the sub-band that was selected.

27. A wireless electronic device associated with a User Equipment (UE) in a communication network served by a Mobile Satellite Service (MSS) satellite, the wireless electronic device comprising:
a transceiver; and
a processor coupled to a memory, wherein the memory is configured to store instructions that when executed by the processor cause the processor to perform operations comprising:

receiving, by the UE, a spectrum usage map comprising guard band frequency bands of a terrestrial Broadband Wireless Access (BWA) network comprising unlicensed frequency bands available for use by the UE;

selecting a communication frequency band among the guard band frequency bands of the BWA network for communication with the MSS satellite; and establishing, by the UE, a communication link with the MSS satellite using the communication frequency band that was selected.

* * * * *